(12) United States Patent
Mitra et al.

(10) Patent No.: US 8,587,868 B2
(45) Date of Patent: Nov. 19, 2013

(54) DEVICE FOR SPLITTING A LIGHT BEAM

(75) Inventors: Thomas Mitra, Düsseldorf (DE); Jana Fründt, Köln (DE)

(73) Assignee: LIMO Patentverwaltung GmbH & Co. KG, Dortmund (DE)

( * ) Notice: Subject to any disclaimer, the term of this patent is extended or adjusted under 35 U.S.C. 154(b) by 323 days.

(21) Appl. No.: 12/389,786

(22) Filed: Feb. 20, 2009

(65) Prior Publication Data

US 2009/0213467 A1 Aug. 27, 2009

(30) Foreign Application Priority Data

Feb. 21, 2008 (DE) .......................... 10 2008 010 382

(51) Int. Cl.
*G02B 27/10* (2006.01)
(52) U.S. Cl.
USPC ........................................................... 359/624
(58) Field of Classification Search
USPC .................... 359/624, 642, 619–620
See application file for complete search history.

(56) References Cited

U.S. PATENT DOCUMENTS

| | | | | |
|---|---|---|---|---|
| 3,635,545 A * | 1/1972 | VanKerkhove et al. | ....... | 359/569 |
| 6,473,239 B1 * | 10/2002 | Volcker et al. | ................. | 359/624 |
| 6,515,257 B1 | 2/2003 | Jain et al. | | |
| 2004/0196559 A1 * | 10/2004 | Lissotschenko | .............. | 359/619 |
| 2007/0070476 A1 | 3/2007 | Yamada et al. | | |
| 2007/0127245 A1 * | 6/2007 | Magarill et al. | .............. | 362/291 |
| 2008/0013183 A1 | 1/2008 | Takeuchi et al. | | |

FOREIGN PATENT DOCUMENTS

| | | |
|---|---|---|
| DE | 10308708 A1 | 9/2004 |
| JP | 10312963 A | 11/1998 |
| JP | 2006349784 A | 12/2006 |
| WO | 2005103795 A1 | 11/2005 |

OTHER PUBLICATIONS

German Search Report, Deutsches Patent—Und Markenamt, dated Oct. 2, 2008.
European Search Report, European Patent Office dated May 27, 2009.
Japanese Office Action for corresponding Japanese Application No. 2009-040026 dated Feb. 26, 2013.

* cited by examiner

*Primary Examiner* — James Greece
(74) *Attorney, Agent, or Firm* — Cheryl F. Cohen; Christa Hildebrand

(57) ABSTRACT

Device for splitting a light beam (1), including at least one lens array (3) with a plurality of lenses ($3_a$-$3_i$) of which at least two have a mutually differing, positive focal length, wherein the light beam (1) that is to be split can pass through the at least one lens array (3) and form at least some mutually separated, at least partially convergent subbeams ($1_a$-$1_i$) after passing through the plurality of lenses ($3_a$-$3_i$), and deflecting means (4) with a plurality of deflecting elements that are arranged downstream of the at least one lens array (3) and can deflect at least some of the subbeams ($1_a$-$1_i$), wherein at least two of the deflecting elements have a different spacing ($d_a$-$d_i$) from the at least one lens array (3).

8 Claims, 1 Drawing Sheet

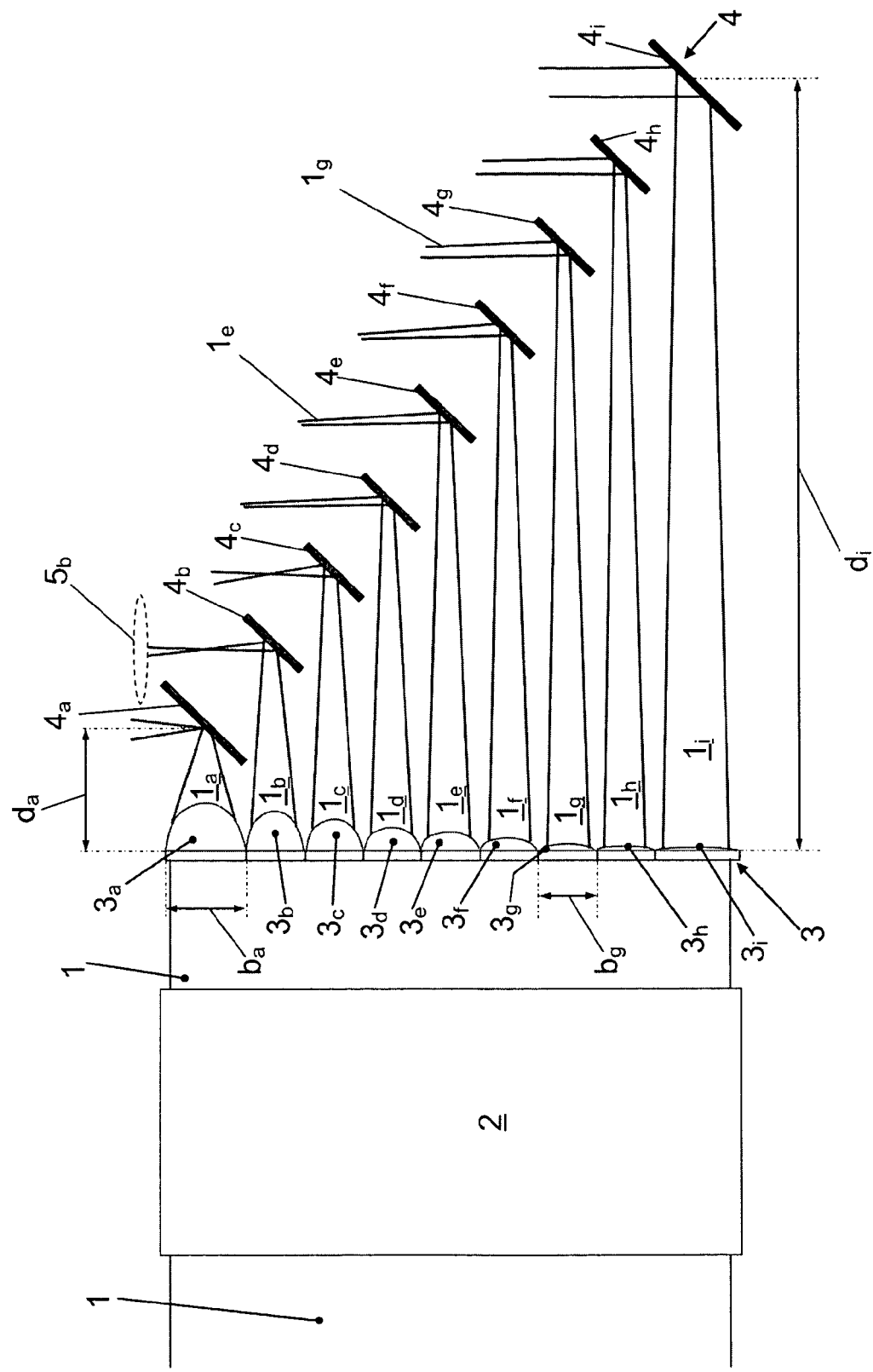

DEVICE FOR SPLITTING A LIGHT BEAM

BACKGROUND OF THE INVENTION (1) Field of the Invention

The present invention relates to a device for splitting a light beam.

Definitions: In the propagation direction of the light beam or laser radiation signifies the mean propagation direction of the light beam or the laser radiation, in particular when this is not a plane wave, or is at least partially divergent or convergent. Unless otherwise expressly specified, light beam, subbeam or beam does not signify an idealized beam of geometric optics, but a real light beam such as, for example, a laser beam with a Ganssien profile or a modified Ganssien profile that has an extended beam cross section not an infinitesimally small one.

2) Description of Related Art

The splitting of a light beam such as, for example, a laser beam of a high energy laser, into a plurality of subbeams is frequently performed in the prior art by polarization beam splitters. These have a particular disadvantage in that they can only reasonably be used given an incident light beam with a defined polarization. If a non-polarized laser beam is to be split into a number of subbeams of equal intensity, said laser beam must be polarized before being split by polarization filters, and this causes substantial power losses.

The splitting of a light beam by a plurality of geometric beam splitters such as mirrors can cause undesired refraction phenomena.

BRIEF SUMMARY OF THE INVENTION

The problem on which the present invention is based is to provide a device of the type mentioned at the beginning that is more effectively configured and, in particular, can also be used to split an unpolarized light beam.

This is achieved according to the invention by a device with the features of claim 1. The dependent claims relate to preferred refinements of the invention.

In accordance with claim 1, the device comprises at least one lens array with a plurality of lenses of which at least two have a mutually differing, positive focal length, wherein the light beam that is to be split can pass through the at least one lens array and form at least some mutually separated, at least partially convergent subbeams after passing through the plurality of lenses, wherein the device further comprises deflecting means with a plurality of deflecting elements that are arranged downstream of the at least one lens array and can deflect at least some of the subbeams, and wherein at least two of the deflecting elements have a different spacing from the at least one lens array.

In particular, it is possible in this case for one of the lenses to be respectively assigned to one of the deflecting elements. For example, it can be the case here that a first deflecting element, which is assigned to a first lens with a first focal length, has a smaller spacing from the at least one lens array than a second deflecting element, which is assigned to a second lens with a second focal length, which is larger than the first focal length.

The inventive configuration of the lens array renders it possible to arrange the deflecting elements at different distances from the lens array such that, on the one hand, the deflecting elements do not disturb one another and, on the other hand, the subbeams deflected thereby run separately from one another. The different focal lengths of the lenses effect differential convergence of the subbeams. Because of the differential convergence of the subbeams, despite offsetting of the deflecting elements from one another in the propagation direction of the subbeams, the cross sections of the subbeams are small enough upon striking the deflecting elements to respectively ensure the deflection of the complete subbeam.

The deflecting elements can be mirrors, for example.

Furthermore, the lenses can be cylindrical lenses.

It is possible in this case for the device to comprise two lens arrays that respectively have a plurality of cylindrical lenses, wherein the cylinder axes of the cylindrical lenses on the first of the lens arrays are aligned perpendicular to those on the second of the lens arrays.

Furthermore, it is possible for the apertures of at least some of the lenses of the at least one lens array to be equal.

In addition, the two outer lenses of the at least one lens array can have a larger aperture than at least some other ones of the lenses of the at least one lens array. Such a configuration can ensure that the intensities of all the subbeams are equal.

As an alternative thereto, it is possible to select different sizes for the apertures of the individual lenses in such a way that individual or all the subbeams have a mutually differing intensity. Depending on what is required, it is thereby possible to prescribe the ratio of the intensities of the subbeams by configuring the lens array.

It can be provided that the device comprises at least one lens that serves as a Fourier lens and is arranged downstream of one of the deflecting elements in the propagation direction of the light beam to be split, wherein the subbeam deflected by the deflecting element can pass through this lens and be influenced with regard to its beam parameters. In the case of greatly differing focal lengths of the lenses of the lens array, this at least one lens can effect a matching of the beam parameters of the subbeams such that the latter run largely parallel and with equal divergence.

It is possible for the device to comprise homogenizing means that are arranged upstream of the at least one lens array in the propagation direction of the light beam to be split. The homogenizing means can contribute to the effect that the subbeams respectively have equal intensity. Furthermore, the homogenizing means can render the actual beam splitting insensitive to variations in the beam parameters of the laser source.

Further features and advantages of the present invention are made plain with the aid of the following description of preferred exemplary embodiments with reference to the attached figures, in which:

BRIEF DESCRIPTION OF THE SEVERAL VIEWS OF THE DRAWING(S)

FIG. 1 shows a schematic view of the device according to the invention.

DETAILED DESCRIPTION OF THE INVENTION

A Cartesian coordinate system is illustrated in FIG. 1 for the purpose of better orientation.

The device according to the invention is illustrated in FIG. 1. The device is intended to provide for splitting into a number of subbeams $1_a$ to $1_i$ a light beam 1 that is incident in the positive Z-direction, or from the left hand side in FIG. 1, emanates from a high power laser, for example, and is unpolarized, for example. To this end, the device comprises homogenizing means 2 that are indicated merely schematically in FIG. 1. The homogenizing means 2 can have, in the usual way, lens arrays, for example, two cylindrical lens arrays arranged consecutively in the propagation direction Z of the light beam, and Fourier lenses for superimposing the subbeams that have passed through the cylindrical lens arrays.

If the light beam 1 is to be split into subbeams in only one direction such as, for example, the X-direction in FIG. 1, it suffices to homogenize the light beam 1 with regard to the X-direction. However, if the light beam 1 is to be split into subbeams in two directions such as, for example, in the X-direction and Y-direction extending inward in FIG. 1, the homogenization of the light beam 1 should be undertaken both with regard to the X-direction and with regard to the Y-direction. It is then necessary, for example, to provide two additional cylindrical lens arrays whose cylinder axes are aligned perpendicular to the cylinder axes of the already mentioned cylindrical lens arrays.

The device furthermore comprises the lens array 3 through which the light beam 1 homogenized by the homogenizing means 2 passes. The lens array 3 has a plurality of lenses $3_a$ to $3_i$ that are designed in the illustrated exemplary embodiment as cylindrical lenses whose cylinder axes extend in the Y-direction. Nine lenses $3_a$ to $3_i$ are provided in the illustrated exemplary embodiment. It is possible by all means to provide more or fewer lenses in the lens array 3 when more or fewer subbeams are to be generated.

When the light beam 1 is to be split into subbeams in two directions such as, for example, in the X-direction and the Y-direction extending inward in FIG. 1, there is provided an additional cylindrical lens array (not illustrated in FIG. 1) whose cylinder axes extend in the X-direction.

The light beam 1 is split by the lens array 3 into a number of subbeams $1_a$ to $1_i$ that corresponds to the number of lenses $3_a$ to $3_i$. Each of the lenses $3_a$ to $3_i$ of the lens array 3 has a positive focal length that differs from the focal lengths of the other lenses $3_a$ to $3_i$. As a result of this, the subbeams $1_a$ to $1_i$ converge differentially, as is to be seen from FIG. 1. In the illustrated exemplary embodiment, the uppermost lens $3_a$ in FIG. 1 has the shortest focal length, the focal lengths increasing from top to bottom in FIG. 1, such that the lowermost lens $3_i$ has the longest focal length.

All the lenses $3_a$ to $3_i$ are of equal length in the Y-direction. The lenses $3_b$ to $3_h$ are all of equal width and thus have the same aperture such that a comparable portion of the light beam 1 at the input end goes to each of the subbeams $1_b$ to $1_h$. The width $b_g$ of the lens $3_g$ is illustrated by way of example. The subbeams $1_b$ to $1_h$ are therefore equal in intensity when the light beam 1 striking the lens array 3 is homogeneous. The two outer lenses $3_a$ and $3_i$ have a somewhat larger width in the x-direction than the remaining lenses $3_b$ to $3_h$. The width $b_a$ of the lens $3_a$ is illustrated by way of example. The somewhat larger width $b_a$ or aperture of the lenses $3_a$ and $3_i$ takes account of the edges of the radiation field sloping toward the edge of the light beam 1, or of the intensity, reducing toward the edge, of the radiation field assigned to the light beam 1.

This somewhat larger width $b_a$ of the lenses $3_a$ and $3_i$ at the edges can ensure equality of intensity even between the subbeams $1_a$ and $1_i$ at the edges and of the remaining subbeams $1_b$ to $1_h$.

It is by all means possible to select the apertures of the individual lenses $3_a$ to $3_i$ to be of different sizes in such a way that individual or all the subbeams have a mutually differing intensity. Depending on what is required, the ratio of the intensities of the subbeams $1_a$ to $1_i$ can thus be prescribed by the configuration of the lens array 3.

Provided in the propagation direction Z downstream of the lens array 3 are deflecting means 4 that comprise a plurality of mirrors $4_a$ to $4_i$ serving as deflecting elements. Here, one of the mirrors $4_a$ to $4_i$ is assigned to each of the lenses $3_a$ to $3_i$ such that each of the mirrors $4_a$ to $4_i$ reflects one of the subbeams $1_d$ to $1_i$ upward in FIG. 1 or from the Z-direction into the positive X-direction. The mirrors $4_a$ to $4_i$ all have a different spacing from the lens array 3. Illustrated by way of example are the spacing $d_a$ and $d_i$ between the uppermost mirror $4_a$ and the lens array 3, and between the lowermost mirror $4_i$ and the lens array 3. Despite the offset of the mirrors $4_a$ to $4_i$ in the Z-direction, because of their difference in intensity of the convergence of the subbeams $1_a$ to $1_i$, the cross sections of the subbeams $1_a$ to $1_i$ are small enough when the mirrors $4_a$ to $4_i$ are struck to respectively ensure a reflection of the complete subbeam $1_a$ to $1_i$.

It is by all means possible to align the mirrors $4_a$ to $4_i$ in such a way that the subbeams $1_a$ to $1_i$ do not run parallel to one another after reflection but, for example, move away from one another or diverge.

When the differences between the focal length of the lenses $3_a$ to $3_i$ is large, it can be sensible in some circumstances to influence the radiation parameters of at least individual ones of the subbeams $1_a$ to $1_i$ by additional lenses so as to fit the radiation parameters of the reflected subbeams $1_a$ to $1_i$ to one another. One such optional lens $5_b$, which is, for example, placed in the beam path in a Fourier arrangement, is illustrated in dashed lines in the beam path of the subbeam $1_i$. It is entirely possible to arrange comparable lenses in the beam paths of a number of, or all subbeams $1_a$ to $1_i$.

It may be mentioned at this juncture that the homogenizing means 2 should be configured such that the numerical aperture of the light beam 1 upstream of the lens array 3 is smaller than the numerical aperture of any of the lenses $3_a$ to $3_i$.

The invention claimed is:

1. A device for splitting a light beam (1), comprising at least one lens array (3) with a plurality of lenses ($3_a$-$3_i$) of which at least two have a mutually differing, positive focal length, wherein the light beam (1) that is to be split is capable of passing through the at least one lens array (3) and form at least some mutually separated, at least partially convergent subbeams ($1_a$,$1_i$) after passing through the plurality of lenses ($3_a$-$3_i$), and deflecting means (4) with a plurality of deflecting elements that are arranged downstream of the at least one lens array (3) and capable of deflecting at least some of the subbeams wherein at least two of the deflecting elements have a different spacing ($d_a$-$d_i$) from the at least one lens array (3);

wherein each of the subbeams generated by one of the lenses ($3_a$-$3_i$) is deflected by one of the deflecting elements;

wherein the first deflecting element, which is assigned to a first lens ($3_a$) with a first focal length, has a smaller spacing ($d_a$) from the at least one lens array (3) than a second deflecting element, which is assigned to a second lens ($3_i$) with a second focal length, which is larger than the first focal length.

2. The device as claimed in claim 1, wherein the deflecting elements are mirrors ($4_a$-$4_i$).

3. The device as claimed in claim 1, wherein the lenses ($3_a$-$3_i$) are cylindrical lenses.

4. The device as claimed in claim 1, wherein the device comprises two lens arrays that respectively have a plurality of cylindrical lenses, wherein the cylinder axes of the cylindrical lenses on the first of the lens arrays (3) are aligned perpendicular to those on the second of the lens arrays (3).

5. The device as claimed in claim 1, wherein the apertures of at least two of the lenses ($3_a$-$3_i$) of the at least one lens array (3) are equal.

6. The device as claimed in claim 1, wherein the two outer lenses ($3_a$, $3_i$) of the at least one lens array (3) have a larger aperture than at least some other ones of the lenses ($3_b$-$3_h$) of the at least one lens array (3).

7. The device as claimed in claim 1, wherein the device comprises at least one lens ($5_b$) that serves as a Fourier lens and is arranged downstream of one of the deflecting elements in the propagation direction of the light beam (1) to be split, wherein the subbeam ($1_i$) deflected by the deflecting element can pass through tins lens ($5_b$) and be influenced with regard to its beam parameters.

8. The device as claimed in claim 1, wherein the device comprises homogenization means (2) that are arranged upstream of the at least one lens array (3) in the propagation direction (Z) of the light beam (1) to be split.

\* \* \* \* \*